US012218443B2

(12) United States Patent
Miura

(10) Patent No.: US 12,218,443 B2
(45) Date of Patent: Feb. 4, 2025

(54) WIRELESS COMMUNICATION DEVICE AND WIRELESS COMMUNICATION METHOD

(71) Applicant: NEC Platforms, Ltd., Kawasaki (JP)

(72) Inventor: Ken Miura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 344 days.

(21) Appl. No.: 17/641,202

(22) PCT Filed: Jul. 2, 2020

(86) PCT No.: PCT/JP2020/026062
§ 371 (c)(1),
(2) Date: Mar. 8, 2022

(87) PCT Pub. No.: WO2021/059651
PCT Pub. Date: Apr. 1, 2021

(65) Prior Publication Data

US 2022/0344824 A1 Oct. 27, 2022

(30) Foreign Application Priority Data

Sep. 26, 2019 (JP) ................................ 2019-174873

(51) Int. Cl.
*H01Q 9/42* (2006.01)
*H01Q 1/22* (2006.01)
(Continued)

(52) U.S. Cl.
CPC ............. *H01Q 9/42* (2013.01); *H01Q 1/2291* (2013.01); *H01Q 19/021* (2013.01); *H01Q 1/243* (2013.01)

(58) Field of Classification Search
CPC ........ H01Q 1/2291; H01Q 1/243; H01Q 9/42; H01Q 19/021; H01Q 19/10
See application file for complete search history.

(56) References Cited

U.S. PATENT DOCUMENTS 7,466,277 B2 * 12/2008 Ishizuka .................. H01Q 9/42 343/702
2005/0057407 A1 * 3/2005 Imaizumi ................. H01Q 9/42 343/702
(Continued)

FOREIGN PATENT DOCUMENTS

JP 2006-166265 A 6/2006
JP 2009-130451 A 6/2009
(Continued)

OTHER PUBLICATIONS

International Search Report for PCT Application No. PCT/JP2020/026062, mailed on Oct. 6, 2020.
(Continued)

*Primary Examiner* — Daniel Munoz

(57) ABSTRACT

A wireless communication device and a wireless communication method capable of improving the directivity of an antenna in a desired direction for a low cost are provided. According to one example embodiment, a wireless communication device includes: a printed board having a substrate surface; a ground plane having a plate shape that is disposed on the substrate surface, connected to the ground potential, and is parallel to the substrate surface; an omnidirectional antenna that is disposed alongside the ground plane on the substrate surface in one direction in a plane parallel to the substrate surface, and is caused to emit radio waves by being supplied with power; and a parasitic antenna that is disposed away from the ground plane in a direction perpendicular to the substrate surface and resonates with the omnidirectional antenna supplied with power.

17 Claims, 23 Drawing Sheets

(51) Int. Cl.
*H01Q 19/02* (2006.01)
*H01Q 1/24* (2006.01)

(56) References Cited

U.S. PATENT DOCUMENTS

| | | | | |
|---|---|---|---|---|
| 2006/0125700 | A1 | 6/2006 | Kanazawa | |
| 2014/0320379 | A1* | 10/2014 | Hamabe | H01Q 1/523 343/893 |
| 2016/0301127 | A1 | 10/2016 | Sonoda et al. | |
| 2017/0279200 | A1 | 9/2017 | Koshi et al. | |
| 2022/0123475 | A1 | 4/2022 | Miura | |

FOREIGN PATENT DOCUMENTS

| | | | |
|---|---|---|---|
| JP | 2009-188737 | A | 8/2009 |
| JP | 2012-005146 | A | 1/2012 |
| JP | 2020-127080 | A | 8/2020 |
| WO | 2016/106140 | A1 | 7/2015 |
| WO | 2016/092801 | A1 | 6/2016 |
| WO | 2018/180877 | A1 | 10/2018 |

OTHER PUBLICATIONS

JP Office Action for JP Application No. 2019-174873, mailed on Sep. 29, 2020 with English Translation.

* cited by examiner

WIRELESS COMMUNICATION DEVICE AND WIRELESS COMMUNICATION METHOD

This application is a National Stage Entry of PCT/JP2020/026062 filed on Jul. 2, 2020, which claims priority from Japanese Patent Application 2019-174873 filed on Sep. 26, 2019, the contents of all of which are incorporated herein by reference, in their entirety.

TECHNICAL FIELD

The present disclosure relates to a wireless communication device and a wireless communication method.

BACKGROUND ART

In recent years, in accordance with an increase in rate of wireless communication, wireless communication devices having more favorable wireless communication characteristics have been demanded. As for such wireless communication devices, for example, the demand for home routers that conform to, for example, the Worldwide Interoperability for Microwave Access (WiMAX) standard or Long Term Evolution (LTE) standard has been increasing.

In order to achieve comfortable wireless communication using an omnidirectional antenna in a home router conforming to such a standard, it is required to install the home router at a place with a high radio field intensity as much as possible. In particular, the communication frequency band in the WiMAX standard is in a gigahertz band, which has high frequencies and has a high propagation loss. Consequently, in a case where a home router conforming to the WiMAX standard is installed at the center or the like of a room at which radio waves are difficult to arrive, comfortable wireless communication cannot sometimes be achieved.

To prevent such situations, a state-of-the-art technology takes measures such that the home router is installed near a window through which radio waves are easily emitted, or a reflection board for adjusting the directivity of the antenna in a direction where radio waves should arrive is attached, as described in Patent Literature 1.

CITATION LIST

Patent Literature

[Patent Literature 1] Japanese Unexamined Patent Application Publication No. 2012-5146
[Patent Literature 2] International Patent Publication No. WO 2016/092801
[Patent Literature 3] Japanese Unexamined Patent Application Publication No. 2009-130451

SUMMARY OF INVENTION

Technical Problem

Unfortunately, existing wireless communication devices formed using an omnidirectional antenna such as an inverted-L antenna have a limitation on improvement in radio wave emission characteristics. For example, possible measures for the home routers described above as an example of existing wireless communication devices cause the following problems.

For example, even if a home router is installed near a window having a large opening, the case with the directivity of the antenna that is not adjusted to the outside of the window does not exert large advantageous effects, and cannot achieve comfortable wireless communication.

The state-of-the-art technology described in Patent Literature 1 and the like that install the reflection board so as to provide the directivity for radio waves requires a reflection board larger in size than the home router.

Furthermore, use of the reflection board as described in the aforementioned Patent Literature 1 causes a disadvantage that radio waves that perform communication between the home router and a subordinate wireless communication terminal (wireless LAN terminal) also have the same directivity as radio waves in the WiMAX standard or LTE standard.

That is, in a case where a home router conforming to the WiMAX standard is installed near a window, for example, an antenna for WiMAX is required to have the directivity of radio waves toward the outside of the window. Inversely, a wireless LAN antenna for wireless communication with a subordinate wireless communication terminal is required to provide the directivity of radio waves toward the room in which the subordinate wireless communication terminal resides, that is, the inside of the window. Consequently, even use of the reflection board as described in the aforementioned Patent Literature 1 and the like cannot support the intended directivity.

The present invention has been made in view of the above circumstances, and an object of the present invention is to provide a wireless communication device and a wireless communication method capable of improving the directivity of an antenna in a desired direction for a low cost.

Solution to Problem

A wireless communication device according to one example embodiment includes: a printed board having a substrate surface; a ground plane having a plate shape that is disposed on the substrate surface, connected to a ground potential, and is parallel to the substrate surface; an omnidirectional antenna that is disposed alongside the ground plane on the substrate surface in one direction in a plane parallel to the substrate surface, and is caused to emit radio waves by being supplied with power; and a parasitic antenna that is disposed away from the ground plane in a direction perpendicular to the substrate surface and resonates with the omnidirectional antenna that has been supplied with power.

A wireless communication method according to one example embodiment includes: a step of preparing a wireless communication device including: a printed board having a substrate surface; a ground plane having a plate shape that is disposed on the substrate surface and is parallel to the substrate surface; an omnidirectional antenna that is disposed alongside the ground plane on the substrate surface in one direction in a surface that is parallel to the substrate surface; and a parasitic antenna that is disposed away from the ground plane in a direction perpendicular to the substrate surface; a step of connecting the ground plane to a ground potential; a step of feeding power to the omnidirectional antenna and thus causing the omnidirectional antenna to emit radio waves; a step of making the parasitic antenna resonate with the omnidirectional antenna that has been supplied with power; and a step of causing the ground plane to reflect the radio waves emitted from the parasitic antenna that has been resonated and emitting the reflected radio waves.

Advantageous Effects of Invention

According to one example embodiment, it is possible to provide a wireless communication device and a wireless communication method capable of improving the directivity of an antenna in a desired direction for a low cost.

DESCRIPTION OF EMBODIMENTS

Preferable example embodiments of a wireless communication device and a wireless communication method according to example embodiments are hereinafter described with reference to the accompanying drawings. Note that drawing reference signs assigned to the following diagrams are assigned to respective elements as an example for facilitating understanding for the sake of convenience. It is a matter of course that there is no intention to limit the present invention to the illustrated aspects.

First Example Embodiment

A wireless communication device according to a first example embodiment will be described. First, the configuration of the wireless communication device according to the first example embodiment will be described. After that, operations of the wireless communication device and a wireless communication method according to the first example embodiment will be described.

Figure 1:
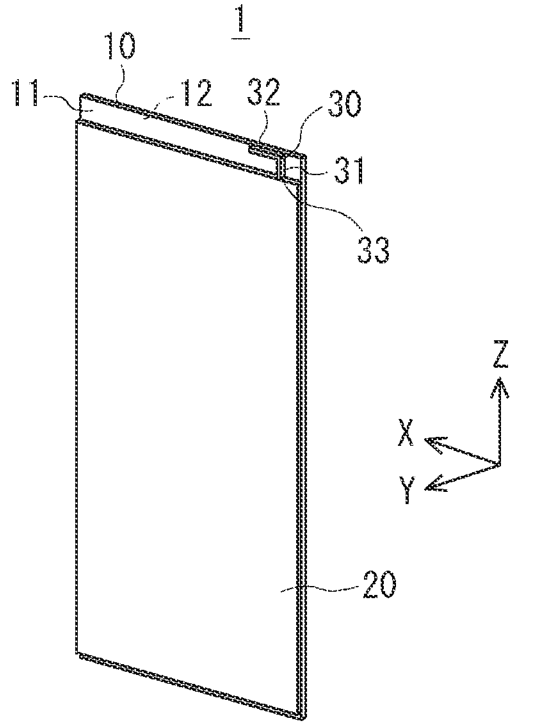
FIG. 1 is a perspective view illustrating a configuration of a wireless communication device without a parasitic antenna according to a first example embodiment.
Figure 2:
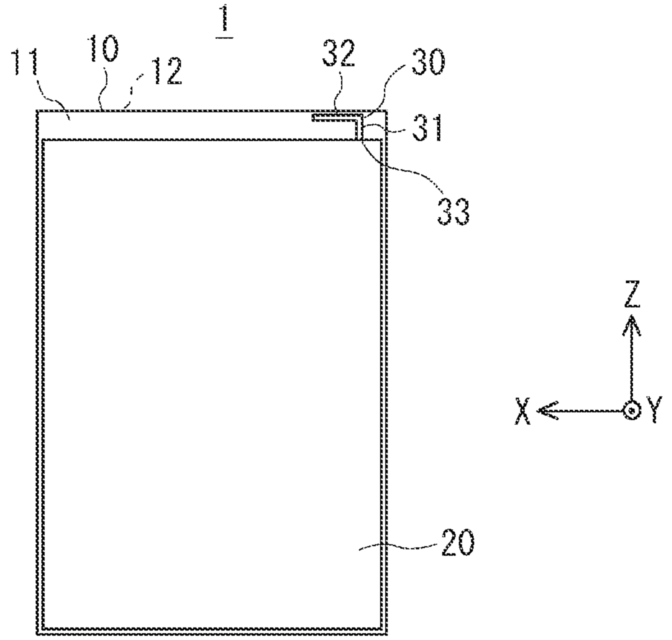
FIG. 2 is a front view illustrating a configuration of the wireless communication device without the parasitic antenna according to the first example embodiment.
Figure 3:
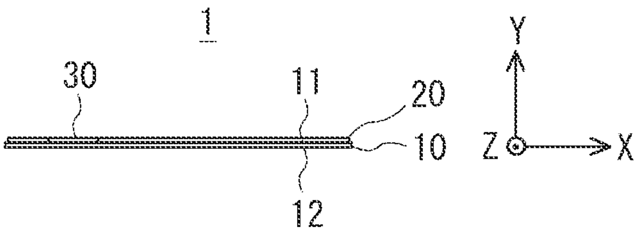
FIG. 3 is a top view illustrating a configuration of the wireless communication device without the parasitic antenna according to the first example embodiment.

FIG. 1 is a perspective view illustrating a configuration of a wireless communication device without a parasitic antenna according to the first example embodiment. FIG. 2 is a front view illustrating a configuration of the wireless communication device without the parasitic antenna according to the first example embodiment. FIG. 3 is a top view illustrating a configuration of the wireless communication device without the parasitic antenna according to the first example embodiment. As shown in FIGS. 1-3, a wireless communication device 1 includes a printed board 10, a ground plane 20, and an omnidirectional antenna 30. The wireless communication device 1 emits or receives, for example, radio waves in a frequency band of 2.4 GHz used in Wi-Fi and a frequency band of 2.6 GHz used in WiMAX.

Here, for convenience of explanation of the wireless communication device 1, an XYZ rectangular coordinate axis system is introduced. For example, one direction in a plane parallel to one plane of the printed board 10 is called a Z-axis direction. The direction in the plane parallel to one plane that is perpendicular to the Z-axis direction is called an X-axis direction. Therefore, the plane parallel to one plane is called an XZ-plane. The direction that is perpendicular to one plane is called a Y-axis direction. Hereinafter, each components of the wireless communication device 1 will be described.

<Printed Board>

The printed board 10, which has a plate shape or a sheet shape, includes one surface and the other surface that is opposite to one surface. One surface is called a substrate surface 11 and the other surface is called a rear surface 12. The printed board 10 includes an insulating material. A circuit pattern is formed of, for example, a metal conductor on the substrate surface 11 of the printed board 10.

<Ground Plane>

The ground plane 20 is disposed on the substrate surface 11 of the printed board 10. The ground plane 20, which has a plate shape, is parallel to the substrate surface 11. The ground plane 20 includes, for example, a metal conductor. The ground plane 20 may have, for example, a rectangular shape when it is seen from the Y-axis direction. The edge of the ground plane 20 on the +Z-axis direction side is a side that is extended in the X-axis direction. The ground plane 20 is connected to the ground potential of the wireless communication device 1. The ground plane 20 covers, for example, parts other than the circuit pattern of the printed board 10.

<Omnidirectional Antenna>

The omnidirectional antenna 30 is disposed on the substrate surface 11 alongside the ground plane 20 in the Z-axis direction. The omnidirectional antenna 30 is disposed on +Z-axis direction side with respect to the ground plane 20. The omnidirectional antenna 30 includes, for example, a metal conductor. The omnidirectional antenna 30 has, for example, an inverted-L shape. Note that the shape of the omnidirectional antenna 30 is not limited to an inverted-L shape. The omnidirectional antenna 30 may have an L-shape or an inverted-F shape when the radio waves to be emitted are omnidirectional. Further, the omnidirectional antenna 30 may be drawn on the substrate surface 11 of the printed board 10 or may be disposed using, for example, a chip antenna. Further, a plurality of omnidirectional antennas 30 may be disposed on the printed board 10.

When the omnidirectional antenna 30 has an inverted-L shape, the omnidirectional antenna 30 includes an extending part 31 that is extended in the Z-axis direction and an extending part 32 that is extended in the X-axis direction. The length of the extending part 31 extending in the Z-axis direction is larger than the width of the extending part 31 extending in the X-axis direction. The length of the extending part 32 extending in the X-axis direction is larger than the width of the extending part 32 extending in the Z-axis direction. For example, the length of the extending part 32 extending in the X-axis direction is larger than the length of the extending part 31 extending in the Z-axis direction.

One end of the extending part 31 extending in the Z-axis direction is connected to a power feeding point 33. For example, the end part of the extending part 31 on the −Z-axis direction side is connected to the power feeding point 33. The other end of the extending part 31 extending in the Z-axis direction is connected to one end of the extending part 32 extending in the X-axis direction. For example, the end part of the extending part 31 on the +Z-axis direction side is connected to the end part of the extending part 32 on the −X-axis direction side.

The omnidirectional antenna 30 emits radio waves by being supplied with power from the power feeding point 33. The radio waves are, for example, wireless radio waves. The frequency of the radio waves emitted by the omnidirectional antenna 30 is, for example, a band of 2.4 GHz. However, the frequency of the radio waves emitted by the omnidirectional antenna 30 is not limited to a band of 2.4 GHz.

<Parasitic Antenna>

Figure 4:
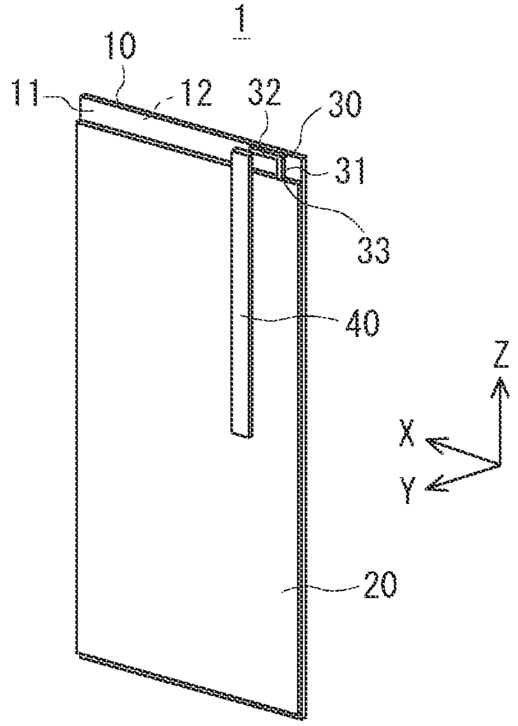
FIG. 4 is a perspective view illustrating the wireless communication device according to the first example embodiment.
Figure 5:
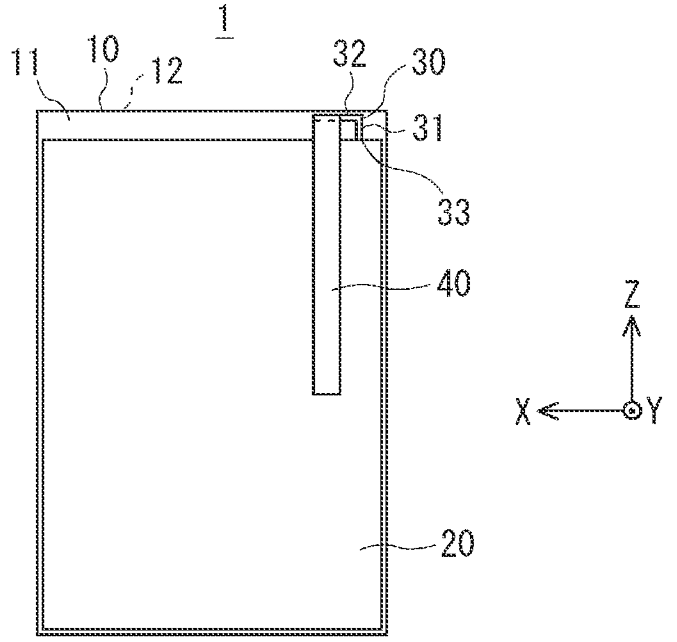
FIG. 5 is a front view illustrating the wireless communication device according to the first example embodiment.
Figure 6:
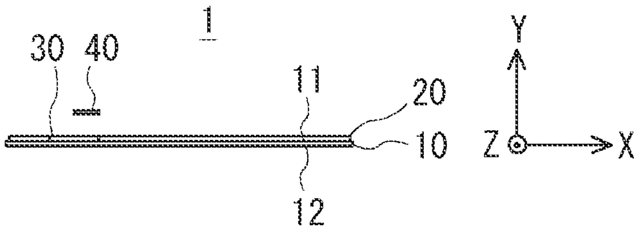
FIG. 6 is a top view illustrating the wireless communication device according to the first example embodiment.

FIG. 4 is a perspective view illustrating the wireless communication device according to the first example embodiment. FIG. 5 is a front view illustrating the wireless communication device according to the first example embodiment. FIG. 6 is a top view illustrating the wireless communication device according to the first example embodiment.

As shown in FIGS. 4-6, the wireless communication device 1 further includes a parasitic antenna 40. The parasitic antenna 40 has, for example, a plate shape that is extended in the Z-axis direction. The plate surface of the parasitic antenna 40 is parallel to the XZ-plane. The parasitic antenna 40 includes, for example, a metal conductor. The parasitic antenna 40 is disposed away from the ground plane 20 in the Y-axis direction perpendicular to the substrate surface 11. When, for example, the frequency of the radio waves emitted by the omnidirectional antenna 30 is a band of 2.4 GHz, the gap between the ground plane 20 and the parasitic antenna 40 is preferably about 5 mm. When the gap is small and the distance between the ground plane 20 and the parasitic antenna 40 is too small, radioactive characteristics tend to deteriorate. When the gap is large and the distance between the ground plane 20 and the parasitic antenna 40 is too large, the directivity due to the parasitic antenna 40 becomes weak. The gap between the ground plane 20 and the parasitic antenna 40 can be adjusted in accordance with the directivity of the wireless communication device 1.

The parasitic antenna 40 is formed to resonate with the omnidirectional antenna 30 that has been supplied with power. Specifically, the parasitic antenna 40 is extended, for example, in the Z-axis direction. The length of the parasitic antenna 40 extending in the Z-axis direction is (½) of the wavelength $\lambda$ of the radio waves emitted by the omnidirectional antenna 30, that is, $\lambda/2$. Accordingly, when a high-frequency current flows through the omnidirectional antenna 30 as a result of power being supplied to the omnidirectional antenna 30, the parasitic antenna 40 is excited. Accordingly, a high-frequency current flows through the parasitic antenna 40 as well. Then, the parasitic antenna 40 emits radio waves.

The parasitic antenna 40 is disposed near the omnidirectional antenna 30. Accordingly, the parasitic antenna 40 can be made to resonate with the omnidirectional antenna 30 that has been supplied with power. The end part of the omnidirectional antenna 30 on a side opposite to the side of the ground plane 20 in the Z-axis direction and the end part of the parasitic antenna 40 extending in the Z-axis direction coincide with each other in the Z-axis direction. Specifically, the end part of the omnidirectional antenna 30 on the +Z-axis direction side and the end part of the parasitic antenna 40 on the +Z-axis direction side coincide with each other in the Z-axis direction. Further, the parasitic antenna 40 is parallel to the extending part 31 of the omnidirectional antenna 30. A part of the extending part 32 of the omnidirectional antenna 30 and a part of the parasitic antenna 40 including the end part of the parasitic antenna 40 on the +Z-axis direction side are opposed to each other in the Y-axis direction. In this way, the parasitic antenna 40 is disposed near the omnidirectional antenna 30 and the parasitic antenna 40 is made to resonate with the omnidirectional antenna 30 that has been supplied with power. Further, the parasitic antenna 40 may be disposed on the end side of the omnidirectional antenna 30, specifically, a part of the extending part 32 which is on a side opposite to the extending part 31 (a part of the extending part 32 which is on the +X-axis direction side with respect to the center thereof). Accordingly, the parasitic antenna 40 can be made to resonate with the omnidirectional antenna 30 that has been supplied with power more easily.

The parasitic antenna 40 is disposed so as to be opposed to the substrate surface 11 of the printed board 10. Accordingly, radio waves emitted from the parasitic antenna 40 can be reflected on the printed board 10 and the ground plane 20. The intensity of the high-frequency current that flows through the parasitic antenna 40 becomes the largest in the central part of the parasitic antenna 40 extending in the length direction. Accordingly, the intensity of the radio waves emitted from the parasitic antenna 40 becomes the largest in this central part. Accordingly, this central part is made to be opposed to the ground plane 20. Accordingly, the radio waves emitted from this center part can be reflected on the ground plane 20 and the intensity of the radio waves emitted toward the +Y-axis direction side can be made large.

<Operations>

Figure 7:
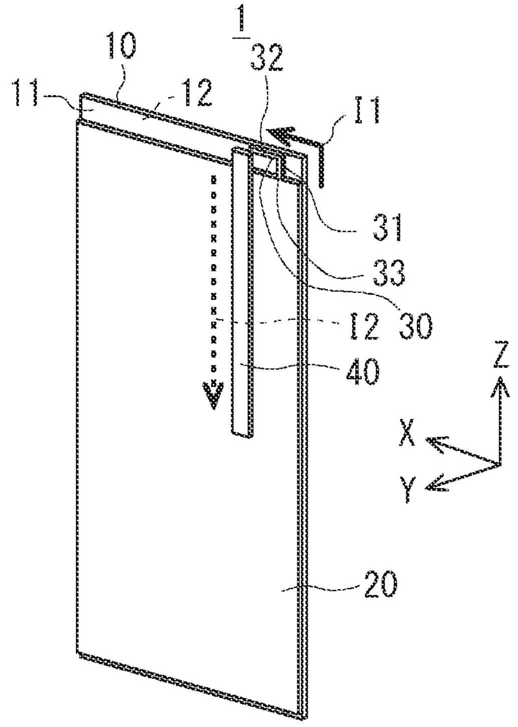
FIG. 7 is a diagram illustrating an operation of the wireless communication device according to the first example embodiment.
Figure 8:
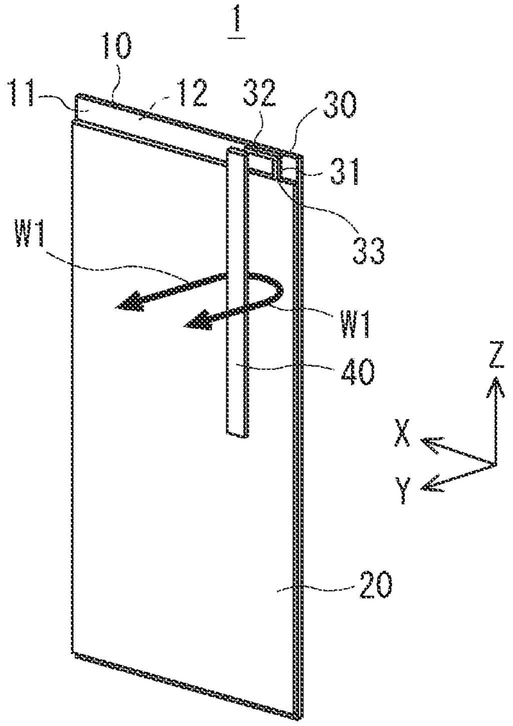
FIG. 8 is a diagram illustrating an operation of the wireless communication device according to the first example embodiment.

Next, operations of the wireless communication device 1 will be described. FIGS. 7 and 8 are diagrams illustrating operations of the wireless communication device according to the first example embodiment. As shown in FIG. 7, a high-frequency current I1 in a frequency of, for example, 2.4 GHz flows through the omnidirectional antenna 30. Specifically, the high-frequency current I1 is supplied from the power feeding point 33 to the extending parts 31 and 32. Then, an excited high-frequency current I2 in a frequency of 2.4 GHz flows through the parasitic antenna 40 disposed near the omnidirectional antenna 30 as well.

The parasitic antenna 40 has a length of (½) of the communication wavelength λ in a frequency of 2.4 GHz. Furthermore, the parasitic antenna 40 is disposed near the omnidirectional antenna 30 and is parallel to the extending part 31. Therefore, the excited high-frequency current I2 in a frequency of 2.4 GHz flows through the parasitic antenna 40.

When the high-frequency current I2 flows through the parasitic antenna 40, radio waves are emitted radially about the parasitic antenna 40. That is, radio waves are emitted radially in the direction vertical to the Z-axis direction from the parasitic antenna 40 that is extended in the Z-axis direction. The parasitic antenna 40 is disposed away from the ground plane 20 on the +Y-axis direction side. Accordingly, radio waves emitted toward the −Y-axis direction side from the parasitic antenna 40 are reflected by the ground plane 20 and the printed board 10.

As shown in FIG. 8, radio waves W1 reflected by the ground plane 20 and the printed board 10 are emitted toward the +Y-axis direction side. Accordingly, radio waves with higher intensity are emitted in the +Y-axis direction. Accordingly, radio waves emitted from the parasitic antenna 40 have a directivity in the +Y-axis direction. The radio waves emitted from the parasitic antenna 40 are vertically polarized on the XY-plane.

Figure 9:
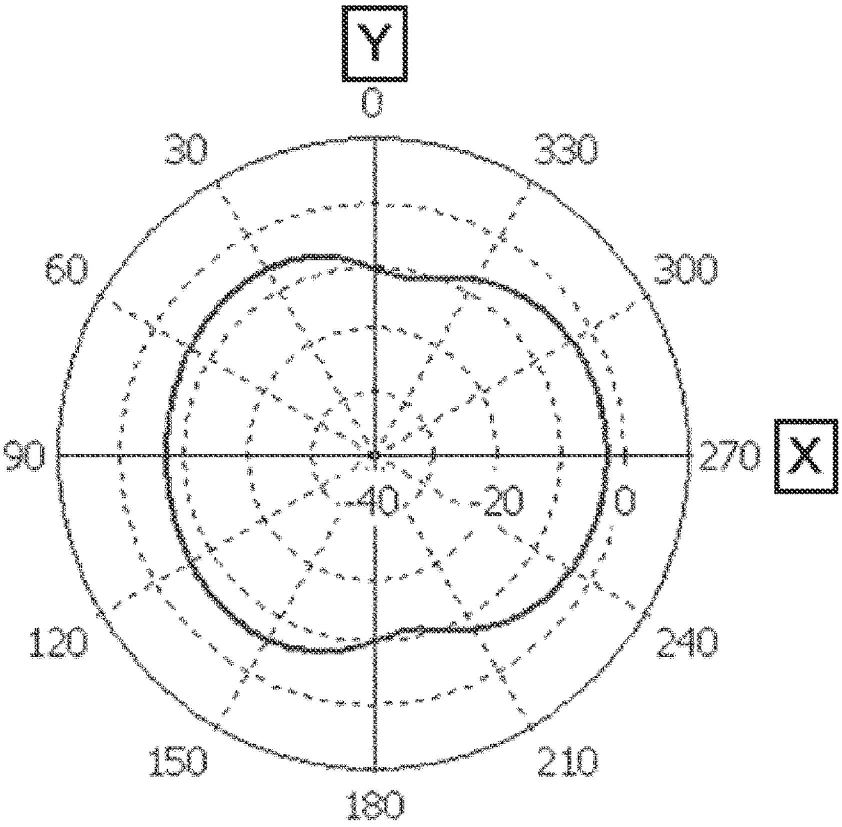
FIG. 9 is a characteristic diagram illustrating an emission pattern of vertically polarized waves on an XY-plane when an omnidirectional antenna is supplied with power in the wireless communication device without the parasitic antenna according to the first example embodiment.
Figure 10:
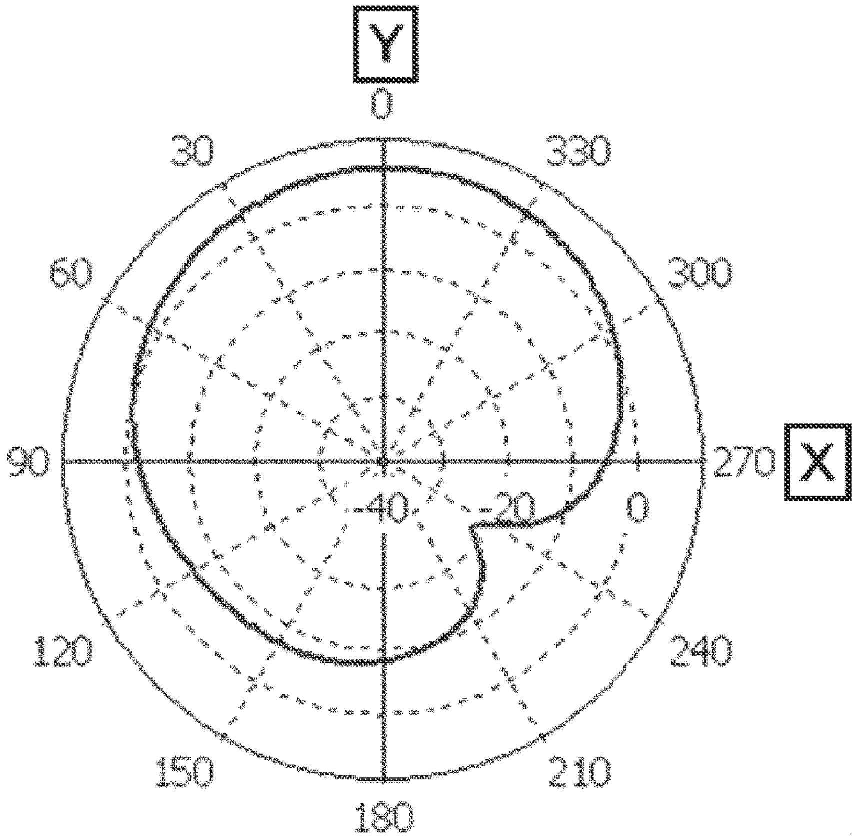
FIG. 10 is a characteristic diagram illustrating an emission pattern of the vertically polarized waves on the XY-plane when the omnidirectional antenna is supplied with power in the wireless communication device according to the first example embodiment.

FIG. 9 is a characteristic diagram illustrating an emission pattern of the vertically polarized waves on the XY-plane when the omnidirectional antenna is supplied with power in the wireless communication device without the parasitic antenna according to the first example embodiment. FIG. 10 is a characteristic diagram illustrating an emission pattern of the vertically polarized waves on the XY-plane when the omnidirectional antenna is supplied with power in the wireless communication device according to the first example embodiment.

As shown in FIG. 9, in a state before the parasitic antenna 40 is implemented, the emission pattern is directed in all the directions on the XY-plane. The emission pattern has a substantially uniform intensity in all the directions on the XY-plane. In the state before the parasitic antenna 40 is implemented, in the wireless communication device 1, only the omnidirectional antenna 30 emits radio waves. Therefore, the wireless communication device 1 in which the parasitic antenna 40 is not implemented does not have a directivity.

Meanwhile, as shown in FIG. 10, in the wireless communication device 1 including the parasitic antenna 40, the intensity of the emission pattern on the +Y-axis direction side on the XY-plane is large. In the state after the parasitic antenna 40 is implemented, radio waves are emitted not only from the omnidirectional antenna 30 but also from the parasitic antenna 40 excited by the omnidirectional antenna 30. Then, the radio waves emitted from the parasitic antenna 40 are reflected toward the +Y-axis direction side by the ground plane 20 and the printed board 10. Accordingly, the wireless communication device 1 has a directivity on the +Y-axis direction side.

(Wireless Communication Method)

Figure 11:
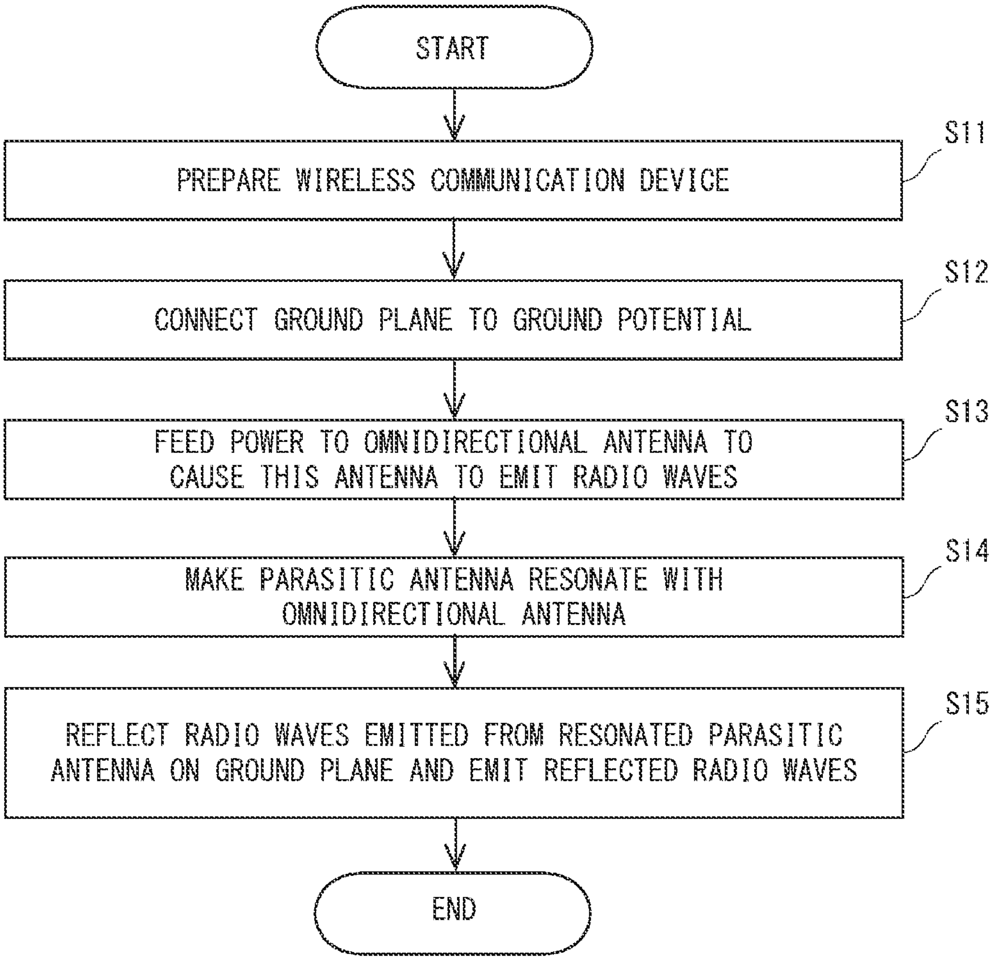
FIG. 11 is a flowchart illustrating a wireless communication method that uses the wireless communication device according to the first example embodiment.

Next, a wireless communication method that uses the wireless communication device 1 according to this example embodiment will be described. FIG. 11 is a flowchart illustrating the wireless communication method that uses the wireless communication device according to the first example embodiment.

As shown in Step S11 in FIG. 11, the wireless communication device 1 is prepared. Specifically, the wireless communication device 1 including the printed board 10, the ground plane 20, the omnidirectional antenna 30, and the parasitic antenna 40 is prepared. The printed board 10 includes the substrate surface 11. The ground plane 20, which has a plate shape, is disposed on the substrate surface 11 and is parallel to the substrate surface 11. The omnidirectional antenna 30 is disposed alongside the ground plane 20 on the substrate surface 11 in the Z-axis direction. The parasitic antenna 40 is disposed away from the ground plane 20 in the +Y-axis direction.

Next, as shown in Step S12, the ground plane 20 is connected to the ground potential. Next, as shown in Step S13, the omnidirectional antenna 30 is supplied with power and the omnidirectional antenna 30 is caused to emit radio waves. Next, as shown in Step S14, the parasitic antenna 40 is made to resonate with the omnidirectional antenna 30 that has been supplied with power. Then, as shown in Step S15, radio waves emitted from the resonated parasitic antenna 40 are reflected on the ground plane 20 and the printed board 10 and the reflected radio waves are emitted. This way, it is possible to perform wireless communication using the wireless communication device 1.

Next, effects of this example embodiment will be described.

The wireless communication device 1 according to this example embodiment is disposed away from the ground plane 20, and includes the parasitic antenna 40 that is made to resonate with the omnidirectional antenna 30 that has been supplied with power. Then, the radio waves that are excited in the omnidirectional antenna 30 and emitted from the parasitic antenna 40 are reflected on the ground plane 20 and the printed board 10 and are emitted toward +Y-axis direction side. Accordingly, the directivity of the antenna in a desired direction can be improved.

The omnidirectional antenna 30 has, for example, an inverted-L shape, and the parasitic antenna 40 has, for example, a plate shape that is extended in one direction, whereby the directivity of the antenna can be improved for a low cost.

By setting the length of the parasitic antenna 40 extending in the Z-axis direction to be (½) of the wavelength λ of the radio waves emitted by the omnidirectional antenna 30, the parasitic antenna 40 can be made to resonate with the omnidirectional antenna 30 that has been supplied with power. Further, the end part of the omnidirectional antenna 30 on the +Z-axis direction side and the end part of the parasitic antenna 40 on the +Z-axis direction side coincide with each other in the Z-axis direction, whereby the radio waves emitted from the parasitic antenna 40 can be reflected on the ground plane 20 and the printed board 10. Accordingly, the directivity of the antenna can be improved.

By providing a plurality of omnidirectional antennas 30 and providing a plurality of parasitic antennas 40 that correspond to the plurality of respective omnidirectional antennas 30, for example, the wireless communication device can comply with various communication standards such as 2×2MIMO (Multiple-Input & Multiple-Output).

Further, by disposing the respective parasitic antennas 40 that correspond to the respective omnidirectional antennas 30 in different positions such as on the side of the substrate surface 11 or the rear surface 12 of the printed board 10, the wireless communication device 1 can be made to have a plurality of directivities. In a case where a home router conforming to the WiMAX standard is installed near a window, an antenna for WiMAX is required to have the directivity of radio waves toward the outside of the window. Inversely, a wireless LAN antenna for wireless communication with a subordinate wireless communication terminal is required to provide the directivity of radio waves toward the room in which the subordinate wireless communication terminal resides, that is, the inside of the window.

Second Example Embodiment

Figure 12:
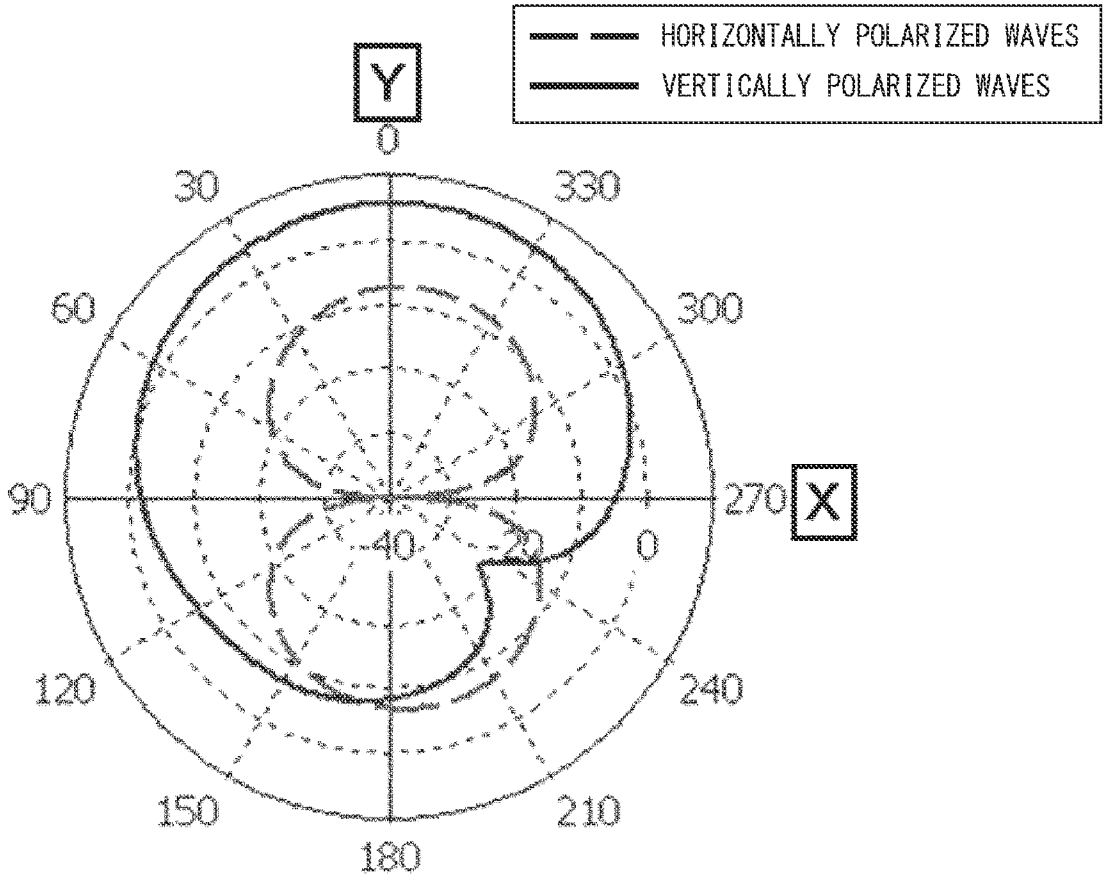
FIG. 12 is a characteristic diagram illustrating emission patterns of the vertically polarized waves and horizontally polarized waves on the XY-plane in the wireless communication device according to the first example embodiment.

Next, a wireless communication device according to a second example embodiment will be described after a problem of the wireless communication device 1 according to the first example embodiment is described. FIG. 12 is a characteristic diagram illustrating emission patterns of vertically polarized waves and horizontally polarized waves on the XY-plane in the wireless communication device according to the first example embodiment. As shown in FIG. 12, as described above with regard to the wireless communication device 1 according to the first example embodiment, vertically polarized waves have a directivity. On the other hand, the horizontally polarized waves do not have a sufficient directivity.

Next, the wireless communication device according to the second example embodiment will be described. In the wireless communication device according to this example embodiment, a parasitic antenna is bent in the middle thereof and a high-frequency current in the horizontal direction is generated. Accordingly, the horizontally polarized waves also have a directivity.

Figure 13:
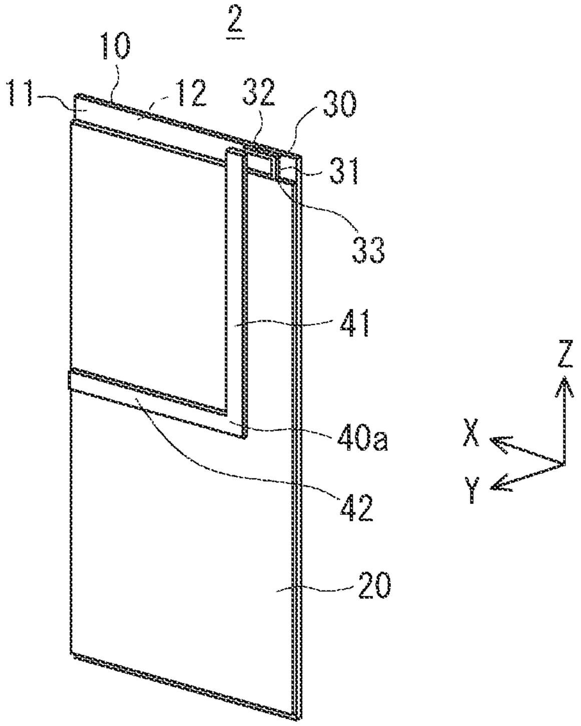
FIG. 13 is a perspective view illustrating a wireless communication device according to a second example embodiment.
Figure 14:
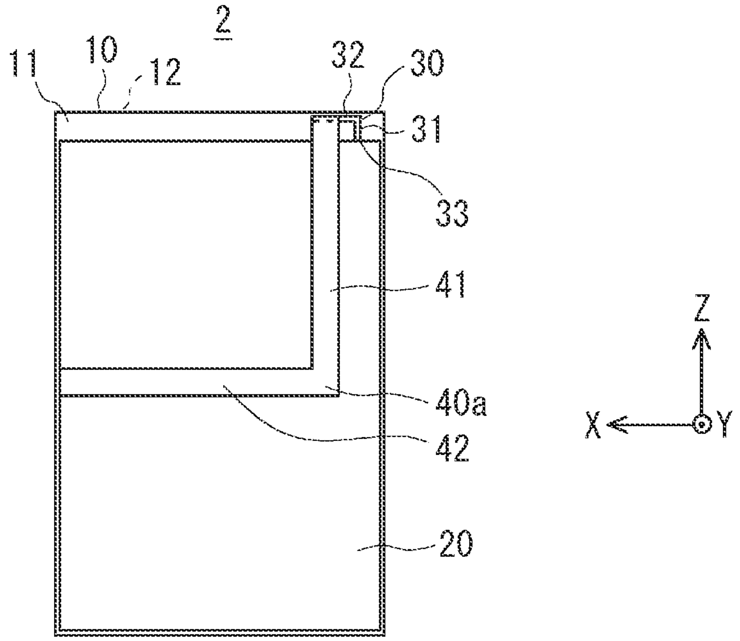
FIG. 14 is a front view illustrating the wireless communication device according to the second example embodiment.
Figure 15:
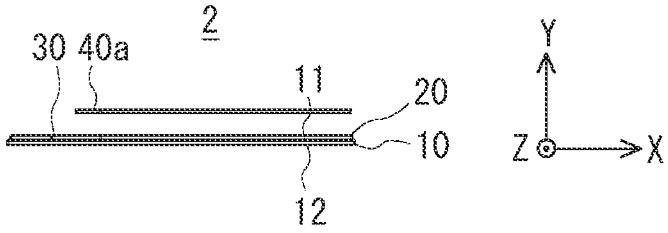
FIG. 15 is a top view illustrating the wireless communication device according to the second example embodiment.

FIG. 13 is a perspective view illustrating the wireless communication device according to the second example embodiment. FIG. 14 is a front view illustrating the wireless communication device according to the second example embodiment. FIG. 15 is a top view illustrating the wireless communication device according to the second example embodiment.

As shown in FIGS. 13-15, a parasitic antenna 40*a* of a wireless communication device 2 has an inverted-L shape when it is seen from the Y-axis direction. The parasitic antenna 40*a* includes an extending part 41 that is extended in the Z-axis direction and an extending part 42 that is extended in the X-axis direction. One end of the extending part 41 extending in the Z-axis direction is connected to one end of the extending part 42 extending in the X-axis direction. Specifically, the end part of the extending part 41 on the −Z-axis direction side is connected to the end part of the extending part 42 on the −X-axis direction side.

The length of the extending part 41 extending in the Z-axis direction is (½) of the wavelength λ of the radio waves emitted by the omnidirectional antenna 30, that is, λ/2. The length of the extending part 42 extending in the X-axis direction is (½) of the wavelength λ of the radio waves emitted by the omnidirectional antenna 30, that is, λ/2. Therefore, the entire length of the parasitic antenna 40*a* is λ.

The parasitic antenna 40*a* is disposed away from the ground plane 20 in the Y-axis direction. That is, the extending part 41 and the extending part 42 are both disposed apart from the ground plane 20 in the Y-axis direction. The width of the extending part 41 extending in the X-axis direction is the same as the width of the extending part 42 extending in the Z-axis direction.

The end part of the extending part 41 extending in the parasitic antenna 40*a* in the +Z-axis direction side and the end part of the omnidirectional antenna 30 on the +Z-axis direction side coincide with each other in the Z-axis direction. The central part of the extending part 41 and the extending part 42 is opposed to the ground plane 20 in the Y-axis direction. The other configurations of the wireless communication device 2 are similar to those of the wireless communication device 1 according to the first example embodiment described above.

Figure 16:
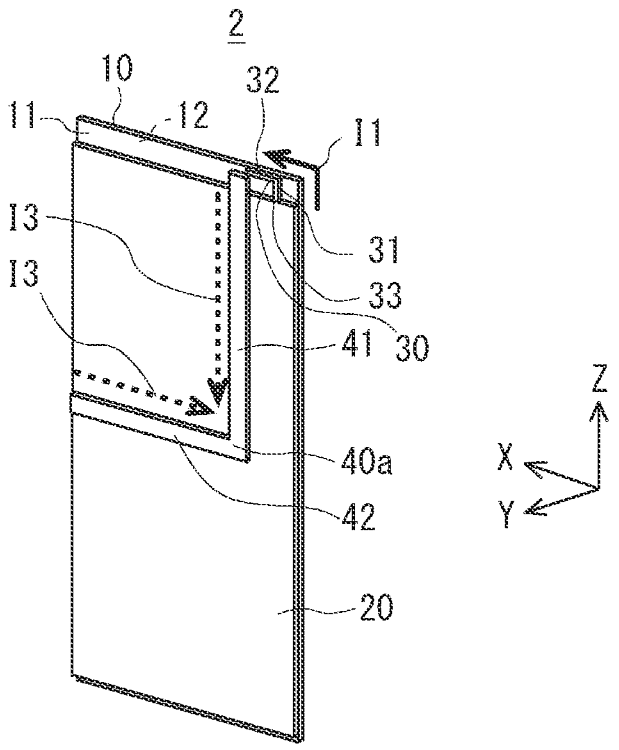
FIG. 16 is a diagram illustrating an operation of the wireless communication device according to the second example embodiment.

Next, an operation of the wireless communication device 2 according to the second example embodiment will be described. FIG. 16 is a diagram illustrating an operation of the wireless communication device according to the second example embodiment. As shown in FIG. 16, for example, a high-frequency current I1 in a frequency of 2.4 GHz flows through the omnidirectional antenna 30. Specifically, a high-frequency current I1 is supplied from a power feeding point 33 to an extending part 31 and an extending part 32. Then, an excited high-frequency current I3 in a frequency of, for example, 2.4 GHz flows through the parasitic antenna 40*a* disposed near the omnidirectional antenna 30 as well.

The entire length of the extending part 41 and the extending part 42 of the parasitic antenna 40*a* is a communication wavelength λ in a frequency of 2.4 GHz. Furthermore, the parasitic antenna 40*a* is disposed near the omnidirectional antenna 30, and is parallel to the extending part 31 and the extending part 32. Therefore, an excited high-frequency current I3 in a frequency of 2.4 GHz flows through the parasitic antenna 40*a*. Specifically, for example, the high-frequency current I3 flows through the —Z-axis direction side from the +Z-axis direction side of the extending part 41 and flows through the −X-axis direction side from the +X-axis direction side of the extending part 42.

When the high-frequency current I3 flows through the parasitic antenna 40*a*, radio waves are emitted radially about the parasitic antenna 40*a*. That is, radio waves are emitted radially from the extending part 41 that is extended in the Z-axis direction in the direction vertical to the Z-axis direction. Further, radio waves are emitted radially from the extending part 42 that is extended in the X-axis direction in the direction vertical to the X-axis direction. The parasitic antenna 40*a* is disposed away from the ground plane 20 on the +Y-axis direction side. Accordingly, the radio waves emitted toward the −Y-axis direction side from the parasitic antenna 40*a* are reflected by the ground plane 20 and the printed board 10.

Figure 17:
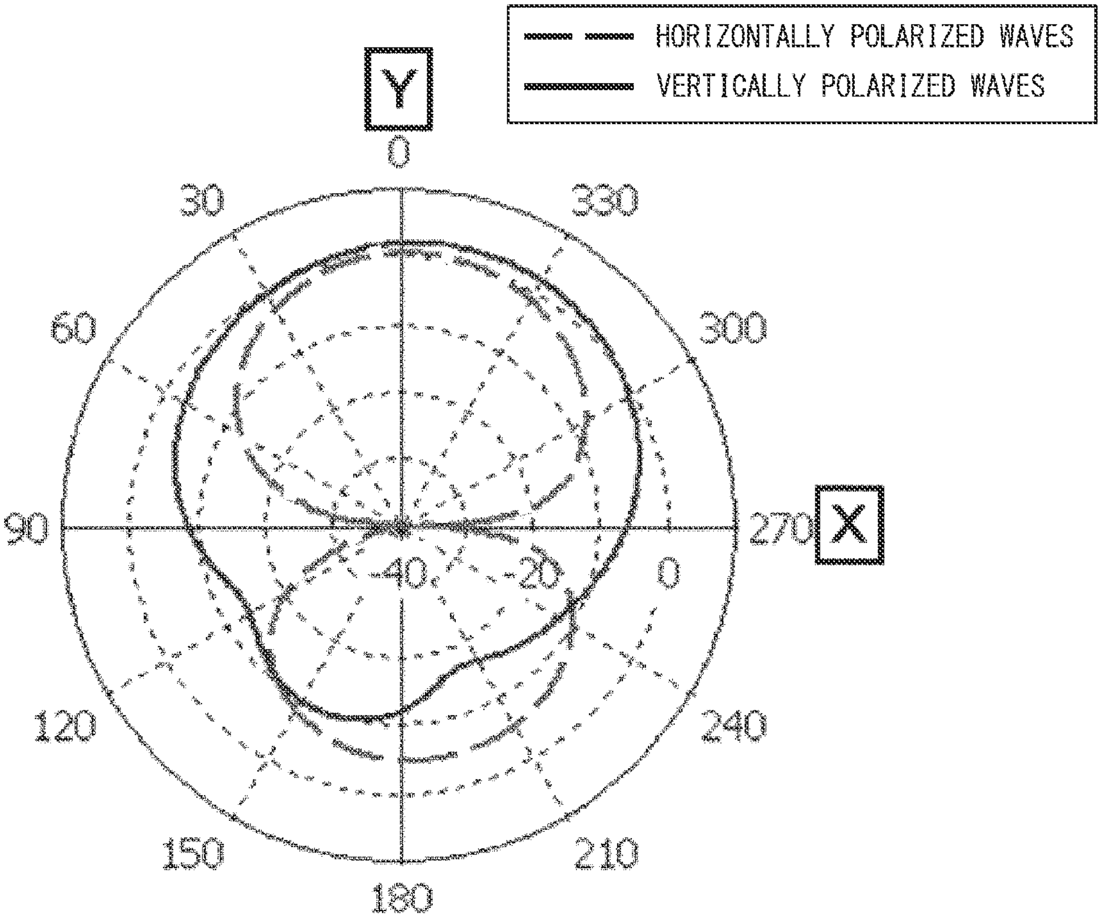
FIG. 17 is a characteristic diagram illustrating emission patterns of vertically polarized waves and horizontally polarized waves on an XY-plane in the wireless communication device according to the second example embodiment.

FIG. 17 is a characteristic diagram illustrating emission patterns of vertically polarized waves and horizontally polarized waves on the XY-plane in the wireless communication device 2 according to the second example embodiment. As shown in FIG. 17, the intensities of the emission patterns of both the vertically polarized waves and the horizontally polarized waves on the XY-plane on the +Y-axis direction side are large. The radio waves emitted from the extending part 41 and the extending part 42 of the parasitic antenna 40*a* are reflected toward the +Y-axis direction by the ground plane 20 and the printed board 10. Accordingly, the wireless communication device 2 has a directivity on the +Y-axis direction side for both the vertically polarized waves and the horizontally polarized waves.

With the wireless communication device 2 according to this example embodiment, by changing the shape of the parasitic antenna 40*a*, both the horizontally polarized waves and the vertically polarized waves are able to have a directivity. Therefore, the emission and the reception can be improved for both the horizontally polarized waves and the vertically polarized waves.

Further, the shape of the parasitic antenna 40*a* may be changed, for example, by making it have a bent structure. Therefore, the directivity can be improved for a low cost. Furthermore, by making it have a bent structure, the degree of freedom of the structure can be improved. The other effects are included in the descriptions of the first example embodiment.

Third Example Embodiment

Next, a wireless communication device according to a third example embodiment will be described. The entire length of the parasitic antenna 40*a* according to the aforementioned second example embodiment is the wavelength λ.

Meanwhile, the entire length of the parasitic antenna of the wireless communication device according to this example embodiment is a half-wavelength long, that is, (λ/2).

Figure 18:
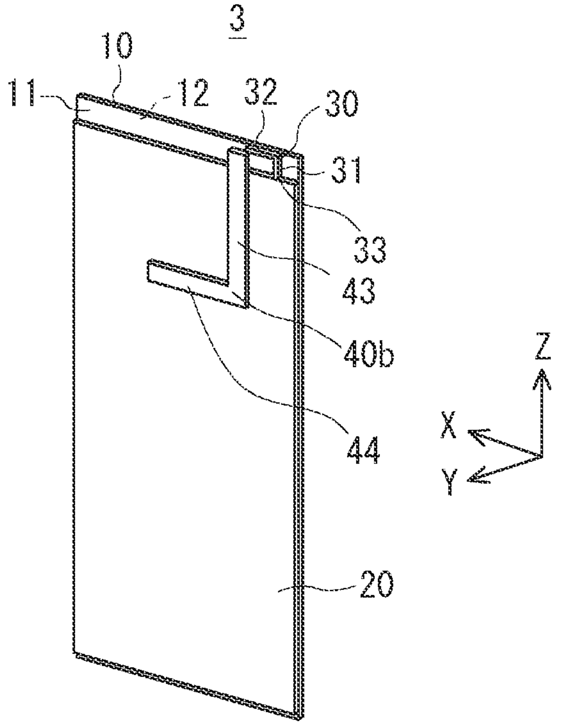
FIG. 18 is a perspective view illustrating a wireless communication device according to a third example embodiment.
Figure 19:
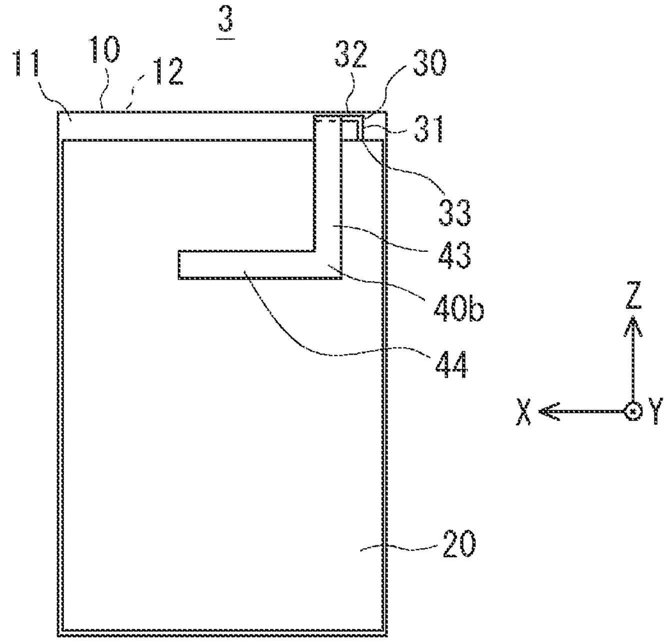
FIG. 19 is a front view illustrating the wireless communication device according to the third example embodiment.
Figure 20:
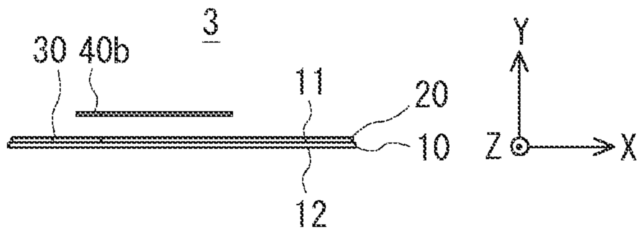
FIG. 20 is a top view illustrating the wireless communication device according to the third example embodiment.

FIG. 18 is a perspective view illustrating the wireless communication device according to the third example embodiment. FIG. 19 is a front view illustrating the wireless communication device according to the third example embodiment. FIG. 20 is a top view illustrating the wireless communication device according to the third example embodiment.

As shown in FIGS. 18-20, a parasitic antenna 40*b* of a wireless communication device 3 has an inverted-L shape. The parasitic antenna 40*b* includes an extending part 43 that is extended in the Z-axis direction and an extending part 44 that is extended in the X-axis direction. The end part of the extending part 43 on the −Z-axis direction side is connected to the end part of the extending part 44 on the −X-axis direction side. The length of the extending part 43 extending in the Z-axis direction is (¼) of the wavelength λ of the radio waves emitted by the omnidirectional antenna 30. The length of the extending part 44 extending in the X-axis direction is (¼) of the wavelength λ of the radio waves emitted by the omnidirectional antenna 30. The parasitic antenna 40*b* is disposed away from ground plane 20 in the Y-axis direction perpendicular to the substrate surface 11. That is, the extending part 43 and the extending part 44 are disposed away from the ground plane 20 in the Y-axis direction. For example, the width of the extending part 43 extending in the X-axis direction is the same as the width of the extending part 44 extending in the Z-axis direction.

Next, an operation of the wireless communication device 3 according to the third example embodiment will be described. For example, a high-frequency current in a frequency of, for example, 2.4 GHz flows through the omnidirectional antenna 30. Then, an excited high-frequency current in a frequency of, for example, 2.4 GHz flows through the parasitic antenna 40*b* that is disposed near the omnidirectional antenna 30 as well.

The entire length of the extending part 43 and the extending part 44 of the parasitic antenna 40*b* is the length of (½) of the communication wavelength λ in a frequency of 2.4 GHz. Furthermore, the parasitic antenna 40*b* is disposed near the omnidirectional antenna 30 and is parallel to the extending part 31 and the extending part 32. Therefore, an excited high-frequency current in a frequency of 2.4 GHz flows through the parasitic antenna 40*b*.

When a high-frequency current flows through the parasitic antenna 40*b*, radio waves are emitted radially about the parasitic antenna 40*b*. That is, the radio waves are emitted radially from the extending part 43 that is extended in the Z-axis direction in the direction vertical to the Z-axis direction. Further, radio waves are emitted radially from the extending part 44 that is extended in the X-axis direction in the direction vertical to the X-axis direction. The parasitic antenna 40*b* is disposed away from the ground plane 20 on the +Y-axis direction side. Accordingly, the radio waves emitted from the parasitic antenna 40*b* toward the −Y-axis direction side are reflected by the ground plane 20 and the printed board 10.

Figure 21:
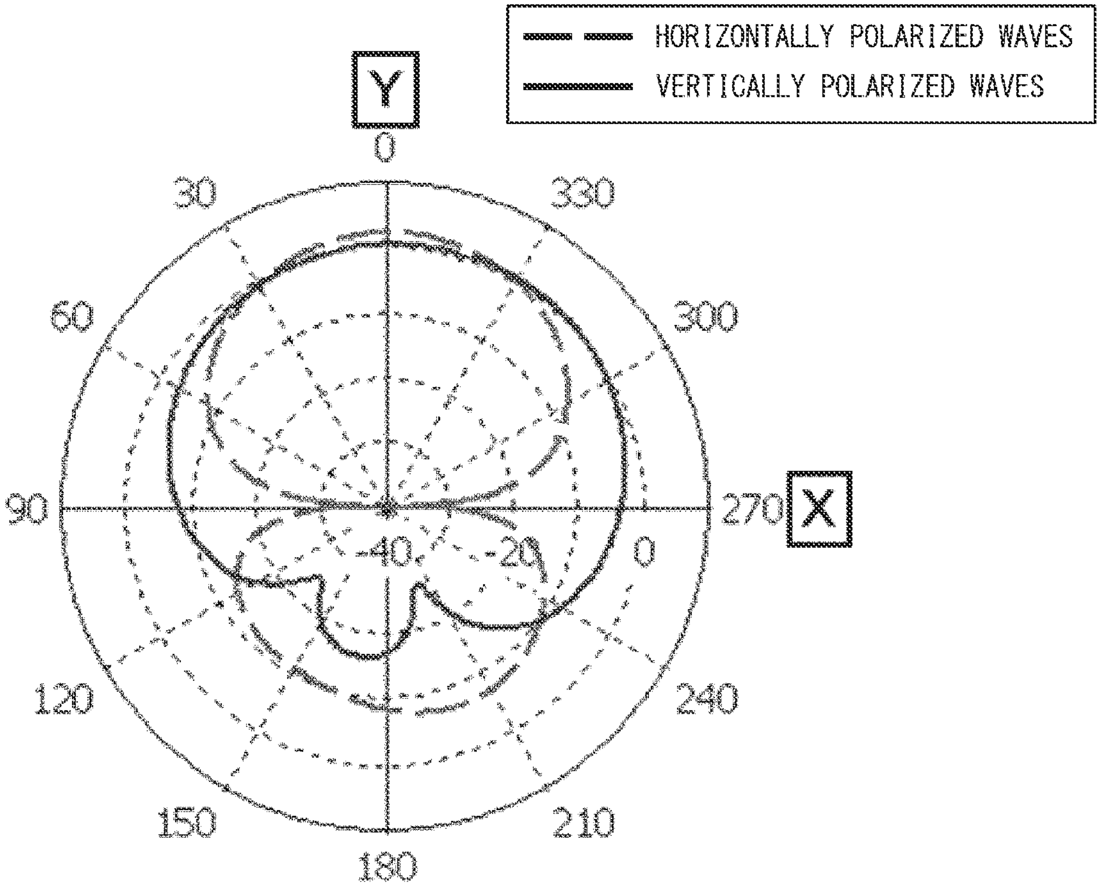
FIG. 21 is a characteristic diagram illustrating emission patterns of vertically polarized waves and horizontally polarized waves on an XY-plane in the wireless communication device according to the third example embodiment.

FIG. 21 is a characteristic diagram illustrating emission patterns of the vertically polarized waves and the horizontally polarized waves on the XY-plane in the wireless communication device according to the third example embodiment. As shown in FIG. 21, the intensities of emission patterns of the vertically polarized waves and the horizontally polarized waves on the XY-plane on the +Y-axis direction side are large. The radio waves emitted from the extending part 43 and the extending part 44 of the parasitic antenna 40*b* are reflected toward the +Y-axis direction side by the ground plane 20 and the printed board 10. Accordingly, the wireless communication device 3 has a directivity on the +Y-axis direction side for both the vertically polarized waves and the horizontally polarized waves.

According to the wireless communication device 3 according to this example embodiment, the size of the parasitic antenna 40*b* can be reduced. Therefore, the size of the wireless communication device 3 can be reduced as well. In this case as well, the directivity can be improved for a low cost. The other configurations, operations, and effects are included in the descriptions of the first and second example embodiments.

Fourth Example Embodiment

Next, a wireless communication device according to a fourth example embodiment will be described. In the aforementioned wireless communication device, the parasitic antenna is disposed on the +Y-axis direction side of the ground plane 20 and the omnidirectional antenna 30. Meanwhile, in the wireless communication device according to this example embodiment, the parasitic antenna is disposed on the +Z-axis direction side of the ground plane 20 and the omnidirectional antenna 30.

Figure 22:
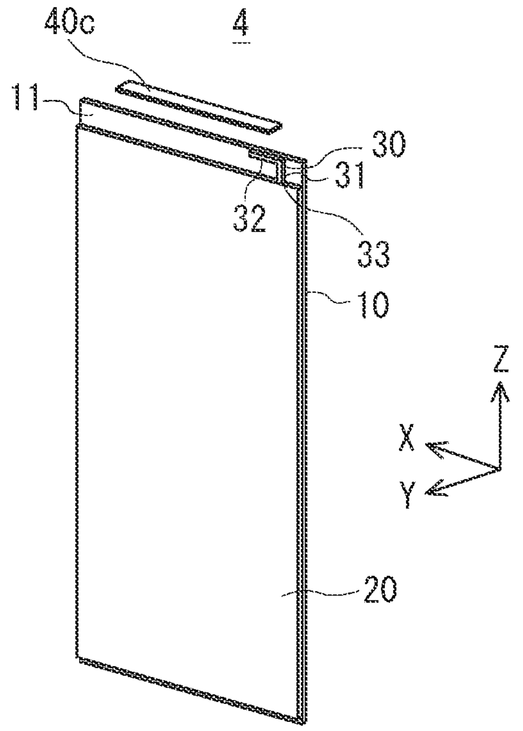
FIG. 22 is a perspective view illustrating a wireless communication device according to a fourth example embodiment.
Figure 23:
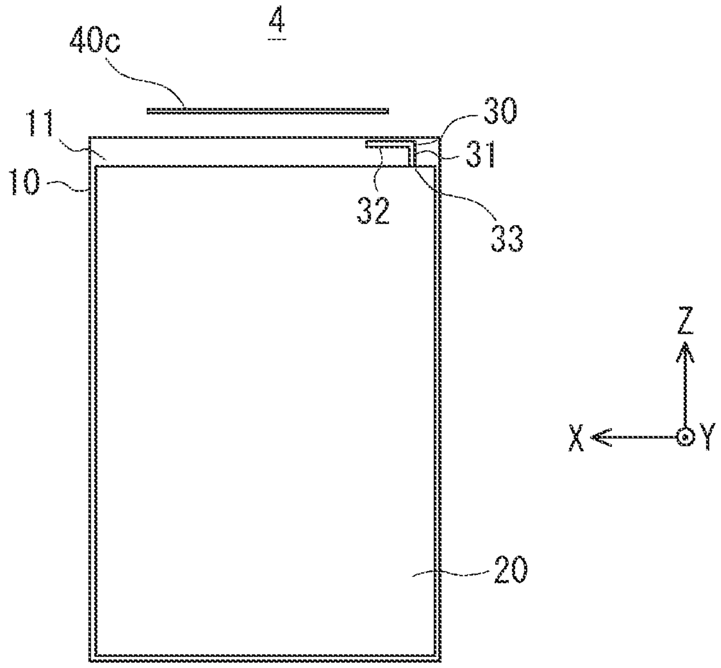
FIG. 23 is a front view illustrating the wireless communication device according to the fourth example embodiment.
Figure 24:
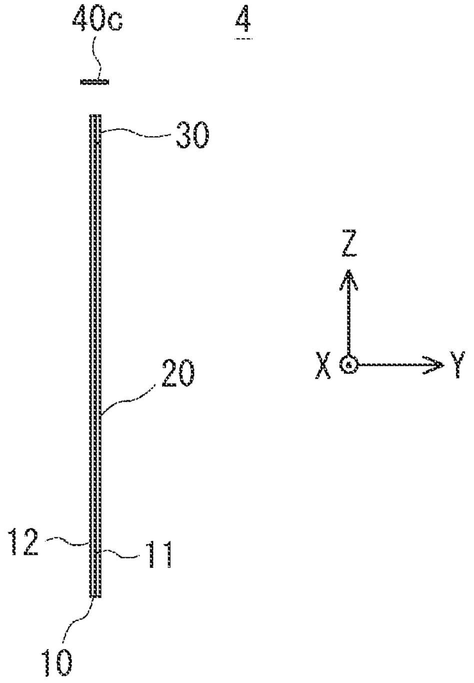
FIG. 24 is a side view illustrating the wireless communication device according to the fourth example embodiment.

FIG. 22 is a perspective view illustrating the wireless communication device according to the fourth example embodiment. FIG. 23 is a front view illustrating the wireless communication device according to the fourth example embodiment. FIG. 24 is a side view illustrating the wireless communication device according to the fourth example embodiment.

As shown in FIGS. 22-24, a wireless communication device 4 according to this example embodiment includes, for example, a parasitic antenna 40*c* having a plate shape that is extended in the X-axis direction. The parasitic antenna 40*c* is disposed away from an omnidirectional antenna 30 on a side opposite to the side of a ground plane 20 in the Z-axis direction. Specifically, the parasitic antenna 40 is disposed away from the omnidirectional antenna 30 on the +Z-axis direction side. The parasitic antenna 40*c* is formed to resonate with the omnidirectional antenna 30 that has been supplied with power. Specifically, the parasitic antenna 40*c* is disposed near the omnidirectional antenna 30. The length of the parasitic antenna 40*c* extending in the X-axis direction is (½) of the wavelength λ of the radio waves emitted by the omnidirectional antenna 30, that is, λ/2.

The length of the parasitic antenna 40*c* extending in the X-axis direction is smaller than the length of the ground plane 20 in the X-axis direction. Accordingly, the radio waves that are reflected on the ground plane 20 and are emitted toward the +Z-axis direction side can be made large. Accordingly, the wireless communication device 1 is able to provide an improved directivity.

Figure 25:
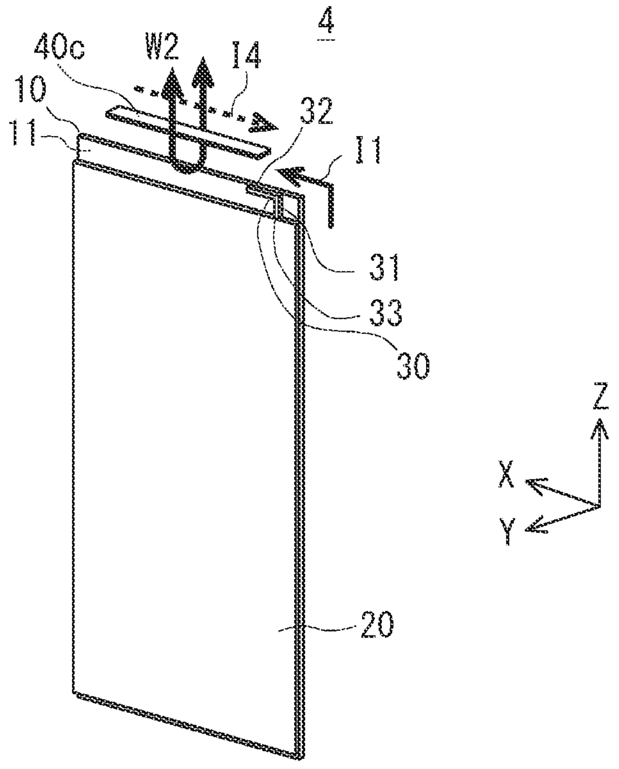
FIG. 25 is a diagram illustrating an operation of the wireless communication device according to the fourth example embodiment.

Next, an operation of the wireless communication device 4 will be described. FIG. 25 is a diagram illustrating operations of the wireless communication device according to the fourth example embodiment. As shown in FIG. 25, a high-frequency current I1 in a frequency of, for example, 2.4 GHz flows through the omnidirectional antenna 30. Then, an excited high-frequency current I4 in a frequency of 2.4 GHz also flows through the parasitic antenna 40*c* disposed near the omnidirectional antenna 30.

The parasitic antenna 40*c* has, for example, a length of (½) of the communication wavelength λ in a frequency of 2.4 GHz. Furthermore, the parasitic antenna 40*c* is disposed near the omnidirectional antenna 30 and is parallel to the extending part 32. Accordingly, the excited high-frequency current I4 in a frequency of 2.4 GHz flows through the parasitic antenna 40*c*.

When the high-frequency current I4 flows through the parasitic antenna 40*c*, radio waves are emitted radially about the parasitic antenna 40*c*. That is, radio waves are emitted radially from the parasitic antenna 40*c* that is extended in the X-axis direction in the direction vertical to the X-axis direction. The parasitic antenna 40*c* is disposed away from the ground plane 20 and the printed board 10 on the +Z-axis direction side. Accordingly, radio waves emitted from the parasitic antenna 40*c* on the −Z-axis direction side are reflected by the ground plane 20 and the printed board 10.

Radio waves W2 emitted by the ground plane 20 and the printed board 10 are emitted toward the +Z-axis direction. Accordingly, radio waves with higher intensity are emitted in the +Z-axis direction. Accordingly, radio waves emitted from the parasitic antenna 40*c* have a directivity in the +Z-axis direction.

Figure 26:
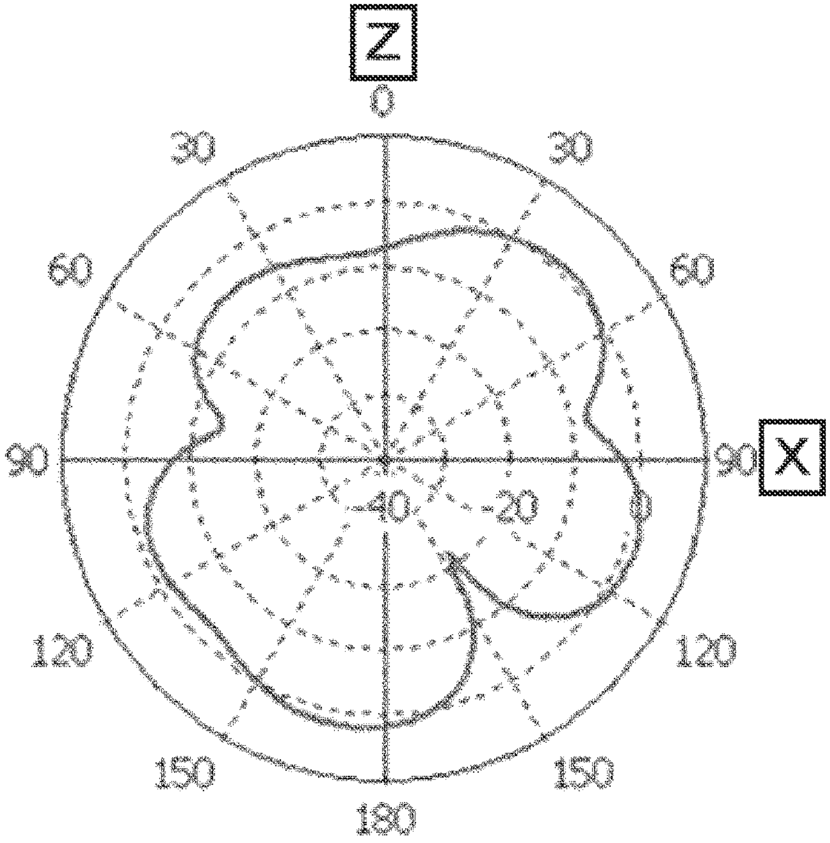
FIG. 26 is a characteristic diagram illustrating an emission pattern of horizontally polarized waves on an XZ-plane in the wireless communication device according to the first example embodiment for the sake of comparison.
Figure 27:
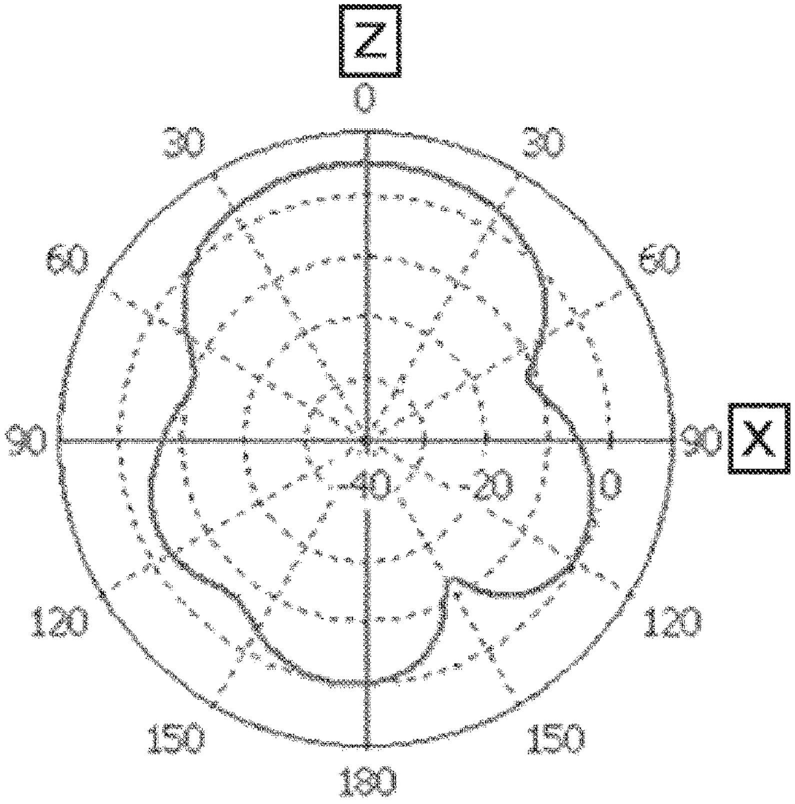
FIG. 27 is a characteristic diagram illustrating an emission pattern of horizontally polarized waves on an XZ-plane in the wireless communication device according to the fourth example embodiment.

FIG. 26 is a characteristic diagram illustrating an emission pattern of the horizontally polarized waves on the XZ-plane in the wireless communication device according to the first example embodiment for the sake of comparison. FIG. 27 is a characteristic diagram illustrating an emission pattern of the horizontally polarized waves on the XZ-plane in the wireless communication device according to the fourth example embodiment.

As shown in FIG. 26, in the wireless communication device 1 according to the first example embodiment compared with the wireless communication device 4 according to this example embodiment, the emission pattern of the horizontally polarized waves is directed uniformly in all the directions on the XZ-plane. Meanwhile, as shown in FIG. 27, in the wireless communication device 4 according to this example embodiment, the intensity of the emission pattern of the horizontally polarized waves on the XZ-plane on the +Z-axis direction side is large. The radio waves emitted from the parasitic antenna 40*c* are reflected on the +Z-axis direction side by the ground plane 20 and the printed board 10. Accordingly, the wireless communication device 4 has a directivity on the +Z-axis direction side.

According to the wireless communication device 4 according to this example embodiment, by changing the position of the parasitic antenna 40*c*, the direction of the directivity can be changed. Specifically, the wireless communication device 4 may have a directivity also in the Z-axis direction along the substrate surface 11 of the printed board 10. Accordingly, the degree of freedom of directivity can be further improved.

By causing the parasitic antenna 40*c* to be disposed near the omnidirectional antenna 30 and causing it to be extended in the X-axis direction, the parasitic antenna 40*c* can be made to resonate with the omnidirectional antenna 30. Further, by setting the length of the parasitic antenna 40*c* extending in the X-axis direction to be (½) of the wavelength λ of the radio waves emitted by the omnidirectional antenna 30, the parasitic antenna 40*c* can be made to resonate with the omnidirectional antenna 30. Therefore, the directivity of the wireless communication device 4 can be improved.

By setting the length of the parasitic antenna 40*c* extending in the X-axis direction to be smaller than the length of the ground plane 20 in the X-axis direction, a sufficient amount of radio waves emitted from the parasitic antenna 40*c* can be emitted in the +Z-axis direction. Therefore, the directivity of the wireless communication device 4 can be improved. The other configurations, operations, and effects are included in the descriptions of the first to third example embodiments.

Note that the present invention is not limited to the aforementioned example embodiments and may be changed as appropriate without departing from the spirit of the present invention. For example, any combination of the configurations of the first to fourth example embodiments is included within the technical scope of the first to fourth example embodiments. Further, the whole or part of the above example embodiments can be described as, but not limited to, the following supplementary notes.

(Supplementary Note 1)

A wireless communication method comprising:

a step of preparing a wireless communication device comprising:

a printed board having a substrate surface;

a ground plane having a plate shape that is disposed on the substrate surface and is parallel to the substrate surface;

an omnidirectional antenna that is disposed alongside the ground plane on the substrate surface in one direction in a surface that is parallel to the substrate surface; and a parasitic antenna that is disposed away from the ground plane in a direction perpendicular to the substrate surface;

a step of connecting the ground plane to a ground potential;

a step of feeding power to the omnidirectional antenna and thus causing the omnidirectional antenna to emit radio waves;

a step of making the parasitic antenna resonate with the omnidirectional antenna that has been supplied with power; and a step of causing the ground plane to reflect the radio waves emitted from the parasitic antenna that has been resonated and emitting the reflected radio waves.

(Supplementary Note 2)

The wireless communication method according to Supplementary Note 1, wherein the omnidirectional antenna, which has an inverted-L shape, includes a first extending part that is extended in the one direction and a second extending part that is extended in another direction perpendicular to the one direction in a surface that is parallel to the substrate surface, one end of the first extending part extending in the one direction is connected to a power feeding point, and another end of the first extending part extending in the one direction is connected to one end of the second extending part extending in the other direction.

(Supplementary Note 3)

The wireless communication method according to Supplementary Note 1 or 2, wherein an end part of the omnidirectional antenna on a side opposite to a side of the ground plane in the one direction and an end part of the parasitic antenna in the one direction coincide with each other in the one direction.

(Supplementary Note 4)

The wireless communication method according to any one of Supplementary Notes 1 to 3, wherein the parasitic antenna is extended in the one direction, and the length of the parasitic antenna in the one direction is (½) of the wavelength of the radio waves emitted from the omnidirectional antenna.

(Supplementary Note 5)

The wireless communication method according to any one of Supplementary Notes 1 to 3, wherein the parasitic antenna, which has an inverted-L shape, includes a third extending part that is extended in the one direction and a fourth extending part that is extended in the other direction perpendicular to the one direction in a surface that is parallel to the substrate surface, and one end of the third extending part extending in the one direction is connected to one end of the fourth extending part extending in the other direction.

(Supplementary Note 6)

The wireless communication method according to Supplementary Note 5, wherein the length of the third extending part extending in the one direction is (½) of the wavelength of the radio waves emitted from the omnidirectional antenna, and the length of the fourth extending part extending in the other direction is (½) of the wavelength of the radio waves emitted from the omnidirectional antenna.

(Supplementary Note 7)

The wireless communication method according to Supplementary Note 5, wherein the length of the third extending part extending in the one direction is (¼) of the wavelength of the radio waves emitted from the omnidirectional antenna, and the length of the fourth extending part extending in the other direction is (¼) of the wavelength of the radio waves emitted from the omnidirectional antenna.

(Supplementary Note 8)

The wireless communication method according to any one of Supplementary Notes 1 to 7, wherein the frequency of the radio waves is a band of 2.4 GHz, and a gap between the ground plane and the parasitic antenna can be adjusted.

While the present invention has been described with reference to the example embodiments, the present invention is not limited by the aforementioned example embodiments. Various changes that may be understood by those skilled in the art within the scope of the invention may be made to the configurations and the details of the present invention.

This application is based upon and claims the benefit of priority from Japanese Patent Application No. 2019-174873, filed on Sep. 26, 2019, the disclosure of which is incorporated herein in its entirety by reference.

REFERENCE SIGNS LIST

1, 2, 3, 4 Wireless Communication Device
10 Printed Board
11 Substrate Surface
12 Rear Surface
20 Ground Plane
30 Omnidirectional Antenna
31, 32 Extending Part
33 Power Feeding Point
40, 40*a*, 40*b*, 40*c* Parasitic Antenna
41, 42, 43, 44 Extending Part
I1, I2, I3, I4 Current
W1, W2 Radio Waves

What is claimed is:

1. A wireless communication device comprising:

a printed board having a substrate surface;

a ground plane having a plate shape that is disposed on the substrate surface, connected to a ground potential, and is parallel to the substrate surface;

an omnidirectional antenna that is disposed alongside the ground plane on the substrate surface in one direction in a plane parallel to the substrate surface, and is caused to emit radio waves by being supplied with power; and a parasitic antenna that is disposed away from the ground plane in a direction perpendicular to the substrate surface and resonates with the omnidirectional antenna that has been supplied with power, wherein the parasitic antenna has a plate shape, and wherein a plate surface of the parasitic antenna is parallel to the substrate surface and opposed to the substrate surface.

2. The wireless communication device according to claim 1, wherein the omnidirectional antenna, which has an inverted-L shape, includes a first extending part that is extended in the one direction and a second extending part that is extended in another direction perpendicular to the one direction in a surface that is parallel to the substrate surface, one end of the first extending part extending in the one direction is connected to a power feeding point, and another end of the first extending part extending in the one direction is connected to one end of the second extending part extending in the other direction.

3. The wireless communication device according to claim 1, wherein an end part of the omnidirectional antenna on a side opposite to a side of the ground plane in the one direction and an end part of the parasitic antenna in the one direction coincide with each other in the one direction.

4. The wireless communication device according to claim 1, wherein the parasitic antenna is extended in the one direction, and the length of the parasitic antenna in the one direction is (½) of the wavelength of the radio waves emitted from the omnidirectional antenna.

5. The wireless communication device according to claim 1, wherein the parasitic antenna, which has an inverted-L shape, includes a third extending part that is extended in the one direction and a fourth extending part that is extended in the other direction perpendicular to the one direction in a surface that is parallel to the substrate surface, and one end of the third extending part extending in the one direction is connected to one end of the fourth extending part extending in the other direction.

6. The wireless communication device according to claim 5, wherein the length of the third extending part extending in the one direction is (½) of the wavelength of the radio waves emitted from the omnidirectional antenna, and the length of the fourth extending part extending in the other direction is (½) of the wavelength of the radio waves emitted from the omnidirectional antenna.

7. The wireless communication device according to claim 5, wherein the length of the third extending part extending in the one direction is (¼) of the wavelength of the radio waves emitted from the omnidirectional antenna, and the length of the fourth extending part extending in the other direction is (¼) of the wavelength of the radio waves emitted from the omnidirectional antenna.

8. The wireless communication device according to claim 1, wherein the frequency of the radio waves is a band of 2.4 GHz, and a gap between the ground plane and the parasitic antenna can be adjusted.

9. A wireless communication device comprising:

a printed board having a substrate surface;

a ground plane having a plate shape that is disposed on the substrate surface, connected to a ground potential, and is parallel to the substrate surface;

an omnidirectional antenna that is disposed alongside the ground plane on the substrate surface in one direction in a plane parallel to the substrate surface, and is caused to emit radio waves by being supplied with power; and a parasitic antenna that is disposed away from the omnidirectional antenna on a side opposite to a side of the ground plane in the one direction and resonates with the omnidirectional antenna that has been supplied with power, wherein the parasitic antenna is extended in another direction that is perpendicular to the one direction in the surface parallel to the substrate surface, the length of the parasitic antenna in the other direction is (½) of the wavelength of the radio waves emitted from the omnidirectional antenna, and the length of the parasitic antenna in the other direction is smaller than the length of the ground plane in the other direction, wherein the parasitic antenna has a plate shape, and wherein a plate surface of the parasitic antenna is perpendicular to the substrate surface and opposed to the substrate surface.

10. A wireless communication method comprising:

preparing a wireless communication device comprising:

a printed board having a substrate surface;

a ground plane having a plate shape that is disposed on the substrate surface and is parallel to the substrate surface;

an omnidirectional antenna that is disposed alongside the ground plane on the substrate surface in one direction in a surface that is parallel to the substrate surface; and a parasitic antenna that is disposed away from the ground plane in a direction perpendicular to the substrate surface, wherein the parasitic antenna has a plate shape, and wherein a plate surface of the parasitic antenna is parallel to the substrate surface and opposed to the substrate surface;

connecting the ground plane to a ground potential;

feeding power to the omnidirectional antenna and thus causing the omnidirectional antenna to emit radio waves;

making the parasitic antenna resonate with the omnidirectional antenna that has been supplied with power; and causing radio waves emitted from the parasitic antenna that has been resonated to be reflected on the ground plane and emitting the reflected radio waves.

11. The wireless communication method according to claim 10, wherein the omnidirectional antenna, which has an inverted-L shape, includes a first extending part that is extended in the one direction and a second extending part that is extended in another direction perpendicular to the one direction in a surface that is parallel to the substrate surface, one end of the first extending part extending in the one direction is connected to a power feeding point, and another end of the first extending part extending in the one direction is connected to one end of the second extending part extending in the other direction.

12. The wireless communication method according to claim 10, wherein an end part of the omnidirectional antenna on a side opposite to a side of the ground plane in the one direction and an end part of the parasitic antenna in the one direction coincide with each other in the one direction.

13. The wireless communication method according to claim 10, wherein the parasitic antenna is extended in the one direction, and the length of the parasitic antenna in the one direction is (½) of the wavelength of the radio waves emitted from the omnidirectional antenna.

14. The wireless communication method according to claim 10, wherein the parasitic antenna, which has an inverted-L shape, includes a third extending part that is extended in the one direction and a fourth extending part that is extended in the other direction perpendicular to the one direction in a surface that is parallel to the substrate surface, and one end of the third extending part extending in the one direction is connected to one end of the fourth extending part extending in the other direction.

15. The wireless communication method according to claim 14, wherein the length of the third extending part extending in the one direction is (½) of the wavelength of the radio waves emitted from the omnidirectional antenna, and the length of the fourth extending part extending in the other direction is (½) of the wavelength of the radio waves emitted from the omnidirectional antenna.

16. The wireless communication method according to claim 14, wherein the length of the third extending part extending in the one direction is (¼) of the wavelength of the radio waves emitted from the omnidirectional antenna, and the length of the fourth extending part extending in the other direction is (¼) of the wavelength of the radio waves emitted from the omnidirectional antenna.

17. The wireless communication method according to claim 10, wherein the frequency of the radio waves is a band of 2.4 GHz, and a gap between the ground plane and the parasitic antenna can be adjusted.

* * * * *